United States Patent Office 3,213,042
Patented Oct. 19, 1965

3,213,042
REACTION PRODUCT OF AN ORGANIC DIISOCY-
ANATE WITH A PRIMARY PHOSPHINE OR
PRIMARY PHOSPHINE OXIDE
Sheldon A. Buckler and Martin Epstein, Stamford, Conn.,
assignors to American Cyanamid Company, Stamford,
Conn., a corporation of Maine
No Drawing. Filed July 13, 1964, Ser. No. 382,412
10 Claims. (Cl. 260—2)

The instant application is a continuation-in-part of copending U.S. application Serial No. 74,233, filed December 7, 1960, and now abandoned.

The present invention relates to organophosphorus polymeric compounds. More particularly, the instant discovery concerns tertiary phosphine and tertiary phosphine oxide condensation polymers, i.e., linear polyamides, of the formula $$\left(-HN-\overset{O}{\underset{\|}{C}}-\overset{O_n}{\underset{\|}{P}}-\overset{O}{\underset{\|}{C}}-\overset{H}{\underset{|}{N}}-R'-\right)_x$$
$$\phantom{xxxxxxxx}\overset{|}{R}$$

wherein R is selected from the group consisting of substituted and unsubstituted, branched and straight chain alkyl ($C_1$–$C_{18}$), substituted and unsubstituted cycloalkyl, substituted and unsubstituted aryl, R' is arylene, substituted and unsubstituted, alkylene ($C_2$–$C_{10}$), substituted and unsubstituted, $n$ equals 0 or 1, and $x$ is a value for the above recurring units of at least 3 and up to 4,000, or more.

Pursuant to the instant invention a primary phosphine or a primary phosphine oxide is reacted with a diisocyanate as follows:

$$R\overset{O_n}{\underset{\|}{P}}H_2 + R'(NCO)_2 \longrightarrow \left(-HN-\overset{O}{\underset{\|}{C}}-\overset{O_n}{\underset{\|}{P}}-\overset{O}{\underset{\|}{C}}-\overset{H}{\underset{|}{N}}-R'-\right)_x$$
$$\phantom{xxxxxxxxxxxxxxxxxxxxxxxx}\overset{|}{R}$$

R, R', $n$ and $x$ in the equation have the meaning given in the novel product formula above.

Typical embodiments of the present invention may be represented as follows:

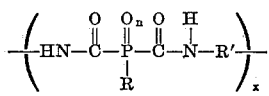

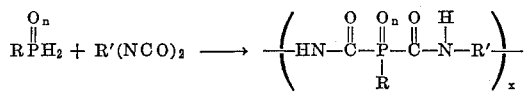

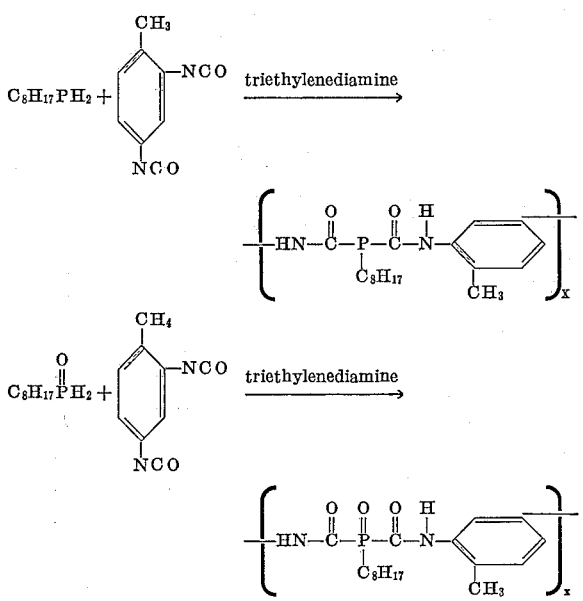

A wide range of temperatures may be employed for the reactions contemplated herein. Generally, a temperature in the range of —20° C. to 200° C., preferably 25° C. to 100° C., is employed.

The reactants are usually brought together in stoichiometric amounts, i.e., 1 mole of diisocyanate per mole of primary phosphine or primary phosphine oxide. However, a stoichiometric excess of either reactant is contemplated herein and the amount of excess is governed by practicality with respect to yield, ease of operation, and the like.

As suggested hereinabove, the catalyst employed according to the present invention may be a tertiary amine. Typical tertiary amines are triethylenediamine, tri(lower) alkylamines, such as trimethylamine, triethylamine, tripropylamine and tributylamine, N-ethylmorpholine, 1,4-dimethylpiperazine, 1,2,4 - trimethylpiperazine, and the like. Still other catalysts contemplated herein are dibutyl tin diacetate, dibutyl tin dilaurate, and the like. Obviously, the skilled chemist will readily recognize that any conventional polymerization catalyst for isocyanate condensation polymerization may be employed.

The amount of catalyst employed is not critical, but usually at least about 0.001 to about 0.1 mole of catalyst per mole of primary phosphine or primary phosphine oxide is employed.

Generally, the reactions contemplated herein are carried out in the presence of an inert organic solvent, such as an aromatic hydrocarbon, including benzene, toluene, xylene, and the like, an ether, such as dioxane, tetrahydrofuran, and the like, a halogenated hydrocarbon, such as carbon tetrachloride, trichloroethane, perchloroethane, and other similar inert solvents. such as dimethylformamide, dimethylsulfoxide, and the like. Typical of all these solvents is the fact that under the conditions of the reaction and in the presence of the reactants and catalysts contemplated herein the solvents do not enter into reaction to any substantial degree.

While very desirable results are obtained by operating at atmospheric pressure, sub-atmospheric and super-atmospheric pressures are within the purview of the present discovery. Likewise, almost any mixing sequence of the reactants is contemplated herein. In addition, the process of the instant invention may be carried out batchwise, semi-continuously or continuously.

Typical primary phosphines and primary phosphine oxides within the scope of the present invention may be found in applicants' copending application Serial No. 824,169, filed July 1, 1959, now U.S. Patent 3,145,234, issued August 18, 1964. In this application primary phosphine oxides are prepared from their corresponding primary phosphines by the use of a peroxide, such as hydrogen peroxide, an organic peroxide and dinitrogen-tetroxide. Reaction is carried out in an inert atmosphere. This copending application is incorporated herewith by reference.

Among the many primary phosphines within the purview of the instant invention are phenylphosphine, cyclohexylphosphine, dorecylphospine, isopropylphosphine, benzylphosphine, 2-ethoxyethylphosphine, para - chlorophenylphosphine, methylphosphine, isobutylphosphine, ethylphosphine, propylphosphine, butylphosphine, pentylphosphine, hexylphosphine, octylphosphine, heptylphosphine, decylphosphine, undecylphosphine, heptadecylphosphine, octadecylphosphine, etc. It follows from the above listing of phosphines that typical substitutents are lower alkoxy, halogen, phenyl, lower alkyl, and the like. According to the copending application referred to just above, these primary phosphines are converted to their corresponding primary phosphine oxides.

Representative aromatic and aliphatic diisocyanate reactants within the purview of the present discovery are 1,3 - phenylene diisocyanate, 2,4 - tolylene diisocyanate, hexamethylene diisocyanate, ethylene diisocyanate, trimethylene diisocyanate, tetramethylene diisocyanate, pentamethylene diisocyanate, octadecylene diisocyanate, decamethylene diisocyanate, methylenedi-p-phenyl diisocyanate, biphenyl-4,4'-diisocyanate, and the like.

The novel polymers of the present invention generally have an intrinsic viscosity of at least about $[n]=0.1$ up to about 3.0, the intrinsic viscosity thereof being determined in dimethylformamide, or like solvent, at 30° C. using a Cannon-Ubbelohde semi-micro dilution viscometer. The molecular weight of these polymers is determined from their intrinsic viscosity measurements [see Flory, "Principles of Polymer Chemistry" (Ithaca, N.Y.; Cornell University Press, 1953), pages 308 to 311] and is in the range of 1600 to 1,000,000, or more, based upon the viscosity measurements disclosed herein.

The polymers are useful in textiles as burning or charring retarders. For example, a 1 to 10 percent solution of the product of any of the examples (infra) in dimethylformamide, or other suitable solvent, may be made up. Thin cotton fabric when dipped in said solution and dried exhibits flame retardance, i.e., the rate at which a flame front on the thus-treated fabric propagates is significantly retarded, when compared in the conventional manner to an identical, only untreated, fabric standard.

The present invention will best be understood from the following examples:

EXAMPLE I

*Octylphosphine-toluene-2,4-diiocyanate polymer*

A solution of 8.7 grams of octylphosphine (0.06 mole) and 0.5 gram of triethylenediamine in 40 milliliters of benzene is placed in a 200-milliliter flask previously purged with nitrogen. To the solution is added 10.4 grams of toluene-2,4-diisocyanate (0.06 mole) dropwise with stirring. A slight exotherm is noticed and the solution begins to thicken and form a viscous gummy solid. The solution is refluxed for 5 hours and the mixture filtered to yield 17.9 grams of polymer, melting point 160° C.–165° C. (94 percent). An intrinisc viscosity of $[n]=0.10$ is found in dimethylformamide, as determined at 30° C. using a Cannon-Ubbellohde semi-micro dilution viscometer. Analysis calculated for $(C_{17}H_{25}N_2O_2P)_x$: C, 63.73; H, 7.87; N, 8.74; P, 9.67. Found: C, 63.55; H, 7.58; N, 9.63; P, 8.38.

EXAMPLE II

*Octylphosphine oxide-toluene-2,4-diiocyanate polymer*

To a solution, purged with nitrogen, of 8.1 grams of octylphosphine oxide (0.05 mole) and 2.0 grams of triethylenediamine in 50 milliliters of anhydrous benzene is added 8.7 grams of toluene-2,4-diisocyanate (0.05 mole). The solution is kept at 50° C. and 50 milliliters of benzene added as the solution becomes very viscous and precipitates a white solid. This is filtered and triturated with ether before collecting 13.5 grams of a low molecular weight polymer, melting point 250° C., dec. The solid is found insoluble in all organic solvents but dimethylformamide in which the intrinsic viscosity is determined as in Example I, above, at 30° C. Analysis calculated for $(C_{17}H_{25}N_2O_3P)_n$: C, 60.70; H, 7.49; N, 8.31; P, 9.21. Found: C, 59.86; H, 7.39; N, 9.63; P, 7.90.

EXAMPLE III

*Isobutylphosphine-toluene-2,4-diisocyanate polymer*

A mixture of 8.5 grams of isobutylphosphine (0.094 mole) and 0.5 gram triethylenediamine dissolved in 100 milliliters of benzene is placed in a 200-milliliter distilling flask previously purged with nitrogen. To this is added 16.4 grams toluene-2,4-diisocyanate (0.094 mole) slowly with stirring. The solution upon standing at room temperature precipitates a white solid overnight. The benzene is refluxed for 2 hours and the mixture filtered to obtain 24.0 grams (96 percent) of a white powder, which decomposes at 265° C.–270° C. The material is insoluble in most organic solvents. Analysis calculated for $C_{13}H_{17}N_2PO_2$: C, 59.08; H, 6.48; N, 10.60; P, 11.72. Found: C, 59.38; H, 6.00; N, 11.73; P, 8.29.

EXAMPLES IV–XV

The following table further illustrates the present invention, the processes being carried out as in the examples, above, except as indicated:

TABLE I

| Example | Reactants Phosphine | Reactants Diisocyanate | Catalyst | Ratio Phosphine:Diisocyanate | Temperature, °C | Solvent | According to Example | Product polymer Instrinsic viscosity* $[n]=$ |
|---|---|---|---|---|---|---|---|---|
| IV | Cyclohexylphosphine. | 1,3-phenylene diisocyanate. | Tripropylamine | 1:1 | 80 | Benzene | I | ca. 0.10. |
| V | Dodecylphosphine. | Hexamethylene diisocyanate. | Triethylenediamine. | 1:1 | 100 | Dimethylformamide. | III | ca. 3.0. |
| VI | Isopropylphosphine. | Ethylene diisocyanate. | Trimethylamine | 1.2:1 | 85 | Perchloroethane | II | ca. 0.3. |
| VII | Benzylphosphine oxide. | Tetramethylene diisocyanate. | Triethylenediamine. | 1:2 | 130 | Dimethylformamide. | I | ca. 1.5. |
| VIII | 2-ethoxyethylphosphine oxide. | Octadecylene diisocyanate. | 1,4-dimethylpiperzaine. | 2:1 | 48 | Dimethylsulfoxide. | III | ca. 2.0. |
| IX | Para-chlorophenyl phosphine. | Decamethylene diisocyanate. | 1,2,4-trimethylpiperazine. | 1:1 | 80 | Carbon tetrachloride. | III | ca. 0.5. |
| X | Methylphosphine oxide. | Methylenedi-p-phenyl diisocyanate. | N-ethylmorpholine. | 1:1 | 130 | Xylene | II | ca. 0.2. |
| XI | Pentylphosphine oxide. | Biphenyl-4,4'-diisocyanate. | do | 1:1 | 78 | Benzene | I | ca. 0.4. |
| XII | Octylphosphine oxide. | Pentamethylene diisocyanate. | Tributylamine | 1:1 | 165 | Dimethylformamide. | I | ca. 1.8. |
| XIII | Octadecylphosphine. | Trimethylene diisocyanate. | Triethylamine | 1:1 | 95 | Dioxane | I | ca. 0.9. |
| XIV | Phenylphosphine. | Hexamethylene diisocyanate. | Triethylenediamine. | 1:1 | 60 | Tetrahydrofuran | I | ca. 0.5. |
| XV | Phenylphosphine oxide. | 1,3-phenylene diisocyanate. | Tripropylamine | 1:1 | 110 | Toluene | I | ca. 0.2. |
| XVI | Phenylphosphine. | Hexamethylene diisocyanate. | Dibutyl tin diacetate. | 1:1 | 55 | THF | I | ca .0.4. |
| XVII | Cyclohexylphosphine. | 1,3-phenylene diisocyanate. | Dibutyl tin dilaurate. | 1:1 | 60 | THF | I | ca. 0.15. |

*Intrinsic viscosity determined as described in Example I, supra, using a Cannon-Ubbelohde semimicro dilution viscometer at 30° C.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A linear polyamide consisting essentially of the recurring unit structure represented by the general formula

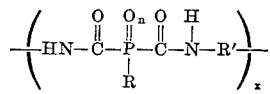

wherein
R is a member selected from the group consisting of alkyl having from 1 to 18 carbon atoms, lower alkoxy-substituted lower alkyl, benzyl, phenyl, halogen-substituted phenyl, and cyclohexyl;
R' is a member selected from the group consisting of phenylene, tolylene, methylene di-para-phenyl, biphenyl-4,4'-, and alkylene having from 2 to 10 carbon atoms;
$n$ is selected from 0 and 1; and
$x$ is a value of at least 3 and up to about 4000.

2. A linear polyamide of claim 1 having an intrinsic viscosity $[n]$ of at least about 0.1 to about 3.0.

3. A process for preparing a condensation polymer having a molecular weight of about 1600 to about 1 million which comprises reacting

and R'(NCO)₂ in the presence of an inert organic solvent and an isocyanate condensation polymerization catalyst, R in the former formula representing a member selected from the group consisting of alkyl having from 1 to 18 carbon atoms, lower alkoxy-substituted lower alkyl, benzyl, phenyl, halogen-substituted phenyl, and cyclohexyl, R' in the latter formula, above, representing a member selected from the group consisting of phenylene, tolylene, methylenedi-p-phenyl, biphenyl-4,4'-, and alkylene having from 2 to 10 carbon atoms, and $n$ is selected from 0 and 1.

4. The process of claim 3 wherein the isocyanate condensation polymerization catalyst is a tertiary amine.

5. The process of claim 3 wherein the isocyanate condensation polymerization catalyst is dibutyl tin diacetate.

6. The process of claim 3 wherein the isocyanate condensation polymerization catalyst is dibutyl tin dilaurate.

7. A condensation polymer of octylphosphine and toluene-2,4-diisocyanate having a molecular weight of about 1600 to about 1 million.

8. A condensation polymer of cyclohexylphosphine and 1,3-phenylene diisocyanate having a molecular weight of about 1600 to about 1 million.

9. A condensation polymer of benzylphosphine oxide and tetramethylene diisocyanate having a molecular weight of about 1600 to about 1 million.

10. A condensation polymer of phenylphosphine oxide and 1,3-phenylene diisocyanate having a molecular weight of about 1600 to about 1 million.

References Cited by the Examiner
UNITED STATES PATENTS
2,969,390   1/61   Buckler _____ 260—2.5

FOREIGN PATENTS
926,268   5/63   Great Britain.

MURRAY TILLMAN, *Primary Examiner.*
SAMUEL H. BLECH, *Examiner.*

UNITED STATES PATENT OFFICE
CERTIFICATE OF CORRECTION

Patent No. 3,213,042            October 19, 1965

Sheldon A. Buckler et al.

It is hereby certified that error appears in the above numbered patent requiring correction and that the said Letters Patent should read as corrected below.

Column 1, line 55, for "$CH_4$" read -- $CH_3$ --; column 2, line 28, for "solvents." read -- solvents, --; line 54, for "dorecylphospine" read -- dodecylphosphine --; column 3, line 17, for "up," read -- up. --; line 27, for "diiocyanate", in italics, read -- diisocyanate --, in italics; line 38, for "intrinisc" read -- intrinsic --; same column 3, line 40, for "Ubbellohde" read -- Ubbelohde --; column 4, line 3, for "-diiocyanate", in italics, read -- -diisocyanate --, in italics; columns 3 and 4, TABLE I, under the heading "Catalyst", opposite Example VIII, for "piperzaine" read -- piperazine --.

Signed and sealed this 31st day of May 1966.

(SEAL)
Attest:

ERNEST W. SWIDER
Attesting Officer

EDWARD J. BRENNER
Commissioner of Patents